United States Patent [19]

Bühler et al.

[11] Patent Number: 5,466,791

[45] Date of Patent: Nov. 14, 1995

[54] MONOAZO DYES, THEIR PREPARATION AND USE

[75] Inventors: Ulrich Bühler, Alzenau; Reinhard Kühn, Frankfurt; Margareta Boos, Hattersheim, all of Germany

[73] Assignee: Cassella Aktiengesellschaft, Frankfurt, Germany

[21] Appl. No.: 387,365

[22] Filed: Feb. 13, 1994

Related U.S. Application Data

[63] Continuation of Ser. No. 276,765, Jul. 18, 1994, abandoned, which is a continuation of Ser. No. 641,913, Jan. 16, 1991, abandoned.

[30] Foreign Application Priority Data

Jan. 22, 1990 [DE] Germany .......................... 40 01 671.4

[51] Int. Cl.$^6$ ............................ C09B 29/00; C09B 49/00
[52] U.S. Cl. .................................. 534/854; 8/639
[58] Field of Search .................... 8/639; 534/854

[56] References Cited

U.S. PATENT DOCUMENTS

| | | | |
|---|---|---|---|
| T964,005 | 11/1977 | Coates | 534/854 |
| 3,406,165 | 10/1968 | Kruckenberg | 534/854 |
| 4,126,610 | 11/1978 | Belfort . | |
| 4,165,297 | 8/1979 | Belfort . | |

FOREIGN PATENT DOCUMENTS

| | | | |
|---|---|---|---|
| 3533980 | 3/1987 | Germany | 534/834 |
| 1479644 | 7/1977 | United Kingdom . | |
| 2011456 | 7/1979 | United Kingdom . | |

*Primary Examiner*—Alan Siegel
*Attorney, Agent, or Firm*—Connolly & Hutz

[57] ABSTRACT

The present invention relates to valuable monoazo dyes of the general formula I

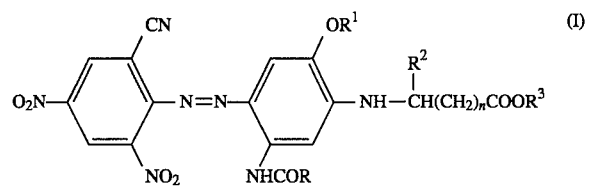

in which
R is methyl or ethyl,
$R^1$ is methyl, ethyl, methoxyethyl or ethoxyethyl,
$R^2$ is methyl or ethyl, if n is equal to 0, and hydrogen, if n is equal to 1,
$R^3$ is methyl, ethyl, n-propyl or i-propyl and
n is 0 or 1,
to mixtures of dyes of the general formula I and to the preparation of these dyes and their mixtures and to their use for the dyeing of hydrophobic fiber materials.

15 Claims, No Drawings

MONOAZO DYES, THEIR PREPARATION AND USE

This application is a continuation of application Ser. No. 08/276,765 filed Jul. 18, 1994, now abandoned, which is a continuation of application Ser. No. 07/641,913 filed Jan. 16, 1991, now abandoned.

The present invention relates to valuable monoazo dyes of the general formula I

in which

R is methyl or ethyl, $R^1$ is methyl, ethyl, methoxyethyl or ethoxyethyl, $R^2$ is methyl or ethyl, if n is equal to 0, and hydrogen, if n is equal to 1, $R^3$ is methyl, ethyl, n-propyl or i-propyl and n is 0 or 1.

The invention also relates to mixtures of dyes of the general formula I and to the preparation of these dyes and their mixtures and to their use for the dyeing of hydrophobic fibre materials.

Methyl is preferred for R and methyl and methoxyethyl are preferred for $R^1$. In the case that n is equal to 0, $R^2$ is preferably methyl.

$R^3$ preferably represents ethyl or methyl, if n is equal to 1, and methyl, ethyl, n- or i-propyl if n is equal to 0. $R^3$ particularly preferably represents methyl, if n is equal to 1, and n- or i-propyl if n is equal to 0.

Dyes similar to the dyes according to the invention of the general formula I are already known and described in the following patents: DE-A 1,544,599, U.S. Pat. Nos. 3,544, 550, 3,553,190, DE-C 1,260,654, GB 1,479,644, U.S. Pat. No. 3,558,593 and DE-C 2,850,994. Dyes having alkoxycarbonylalkylamino groups in the coupling component and showing good wash-fastness after exposure of the dyed substrate which may occur in the course of a finishing process, are disclosed in EP 122,482 and DE-A 3,724,058. However, the alkoxy radicals of these dyes are very low and have 8 to 10 and 8 to 14 C atoms.

Surprisingly, it has now been found that the dyes according to the invention of the general formula I are superior to the dyes of the prior art, in particular in application fastness properties, such as sensitivity to pH, sensitivity to reduction and resistance to boiling and have very good wearfastness properties, such as fastness to dry heat pleating and setting and waterfastness. Moreover, it has been found that they have very good thermal migration fastness, in particular if the dyeing was subjected to a subsequent synthetic resin finish.

The dyes according to the invention of the general formula I are preferably prepared by subjecting an azo dye of the formula II

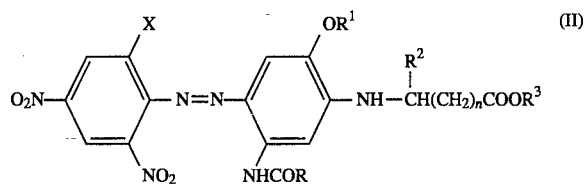

in which X represents chlorine or preferably bromine and R, $R^1$, $R^2$, $R^3$ and n are each as defined above in a manner known per se, for example as described in DE-A-1809920, DE-A-1809921, GB-B-1184825, DE-B-1544563, DE-A-2310745, DE-B-2456495, DE-B-2610675, DE-A-2724116, DE-A-2724117, DE-A-2834137, DE-A-2341109, U.S. Pat. No. 3,821,195, DE-A-2715034 or DE-A-2134896, to a nucleophilic displacement reaction involving the cyanide ion $CN^\ominus$ as the nucleophile. In this reaction, chlorine or bromine X in the dye of the general formula II is displaced by CN.

The dyes of the general formula II are prepared by processes known to one skilled in the art, preferably by diazotising an amine of the formula III

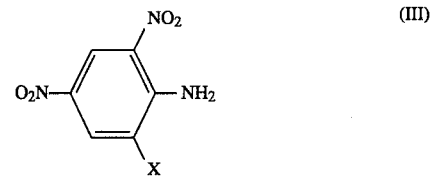

in which X is chlorine or bromine and coupling the product onto an amine of the formula IV

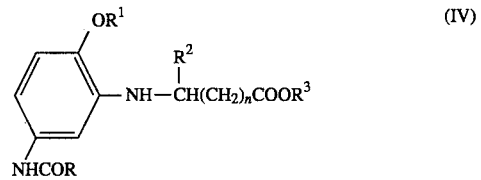

in which R, $R^1$, $R^2$, $R^3$ and n are each as defined above.

Dye mixtures according to the invention contain two or more dyes of the general formula I.

In the dye mixtures according to the invention, the ratio of the various dyes of the general formula I may vary within relatively wide limits, and the dyes may be present as crystal mixtures or wholly or partly in the form of mixed crystals. In general, the minimum proportion of a component is 10% by weight and its maximum proportion is 90% by weight. In the case of dye mixtures which consist of only two dyes of the general formula I, preference is given to a weight ratio of 70:30 to 30:70, i.e. to a weight ratio where one dye counts for 30 to 70% by weight.

The dye mixtures according to the invention can be prepared by various methods, for example:

1) by mixing at least two separately prepared and finished individual dyes of the general formula I;

2) by mixing the separately prepared, unfinished individual dyes and finishing them together; or 3) by mixing the starting materials of the general formulae III and IV or II and reacting them together as described above. If for example the above-described cyano displacement is carried out not on an individual dye of the general formula II but on a mixture of two or more dyes of the general formula II which differ in respect of R, $R^1$, $R^2$, $R^3$ and n the result obtained is a corresponding mixture of the dyes of the general formula I according to the invention.

The dyes and dye mixtures according to the invention are, individually or mixed with other disperse dyes, highly suitable for dyeing and printing hydrophobic synthetic materials. Hydrophobic synthetic materials which come into consideration are for example: cellulose acetate, cellulose triacetate, polyamides and high-molecular secondary weight polyesters. Preferably, the dyes according to the invention are used for dyeing and printing materials made of high-molecular-weight polyesters, in particular those based on polyethylene glycol terephthalates or mixtures thereof with natural fibre materials, or materials made of cellulose triacetate.

The hydrophobic synthetic materials can be present in the form of sheetlike or threadlike structures, having been processed for example into yarns or woven or knitted textile fabrics. The fibre material mentioned can be dyed with the dyes or dye mixtures according to the invention in a conventional manner, preferably from an aqueous suspension in the presence or absence of carriers between 80° and about 110° C. by the exhaust method or in a dyeing autoclave at 110° to 140° C. by the HT method, or by the thermofix process, in which the fabric is padded with the dyeing liquor and then subjected to a dyeing fixing step at about 80° to 230° C. The printing of the materials mentioned can be carried in a conventional manner by incorporating the dyes or dye mixtures according to the invention into a printing paste and treating the fabric printed therewith at temperatures between 80° and 230° C. in the presence or absence of a carrier with HT steam, high-pressure steam or dry heat to fix the dye. This produces very strong greenish blue dyeings and prints having very good fastness properties, in particular very good lightfastness, fastness to dry heat pleating and setting, thermomigration fastness and wash-fastness, in particular a very good M+S fastness (C4A wash).

The dyes or dye mixtures according to the invention are also suitable for dyeing the aforementioned hydrophobic materials from organic solvents by the known solvent dyeing techniques. In the dyeing liquors and printing pastes used in the above applications, the dyes or dye mixtures according to the invention should be present in a very finely divided form.

The dyes are finely divided in a conventional manner by slurrying the synthesized dye together with a dispersant in a liquid medium, preferably water, and subjecting the slurry to the action of shearing forces, the dye particles originally present becoming mechanically reduced in size to such an extent as to maximize the specific surface area and minimize sedimentation of the dye. The particle sizes of the dyes are in general between 0.5 and 5 µm, preferably about 1 µm.

The dispersants used in the milling can be nonionic or anionic. Nonionic dispersants are for example reaction products of alkylene oxides, e.g. ethylene oxide or propylene oxide, with alkylatable compounds, for example fatty alcohols, fatty amines, fatty acids, phenols, alkylphenols and carboxamides. Anionic dispersants are for example ligno-sulphonates, alkyl sulphonates, alkylaryl sulphonates or alkylaryl polyglycol ether sulphates.

The dye preparations thus obtained should be pourable for most applications. For this reason the dye and dispersant content is limited in these cases. In general, the dispersions are standardized to a dye content of up to 50 per cent by weight and a dispersant content of up to about 25%. For economic reasons, dye contents are usually not less than 15 per cent by weight.

The dispersions may also contain further auxiliaries, for example auxiliaries which act as oxidizing agents, e.g. sodium m-nitrobenzenesulphonate, or fungicides, e.g. sodium o-phenylphenolate and sodium pentachlorophenolate and in particular acid donors, e.g. butyrolactone, monochloroacetamide, sodium chloroacetate, sodium dichloroacetate, the sodium salt of 3-chloropropionic acid, a half ester of sulphuric acid, e.g. lauryl sulphate, a sulphuric ester of an ethoxylated or propoxylated alcohol, e.g. butylglycol sulphate.

The dye dispersions thus obtained are very advantageously used for making up printing pastes and dyeing liquors. They offer particular advantages for example in continuous processes, where the dye concentrations of the dyeing liquors must be kept constant by a continuous feed of dye into the running apparatus.

For certain applications it is preferable to use pulverulent formulations. These powders contain the dye or dye mixture, a dispersant and other auxiliaries, for example wetting, oxidizing, preserving and dustproofing agents and the abovementioned acid donors.

A preferred method of preparing pulverulent dye formulations comprises stripping the above-described liquid dye dispersions of their liquid content, for example by vacuum drying, freeze drying or drum drying, but preferably by spray drying.

To prepare the dyeing liquor, the necessary amount of a dye formulation prepared as described above is diluted with the dyeing medium, preferably water, to such an extent as to produce a liquor ratio of 5:1 to 50:1 for the dyeing. In general, further dyeing auxiliaries, such as dispersants, wetting agents and fixing agents, are also added to the liquor. The pH is adjusted to 4–5, preferably 4.5, by the addition of organic and inorganic acids such as acetic acid, succinic acid, boric acid or phosphoric acid. It is advantageous to buffer the pH value reached and to add a sufficient amount of a buffer system. An advantageous buffer system is, for example, the system acetic acid/sodium acetate.

If the dye or dyeing mixture is to be used for textile printing, the necessary amount of dye formulation is kneaded in a conventional manner together with a thickener, for example an alkali metal alginate or the like, and possibly other additives, for example fixation accelerants, wetting agents and oxidizing agents, to form a printing paste.

The invention is further illustrated by the Examples below. Percentages are by weight.

EXAMPLE 1

59.1 g of the dye of the formula

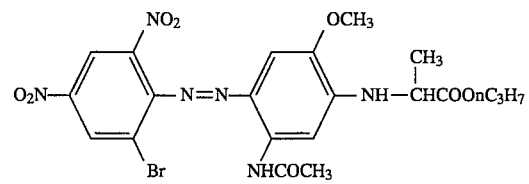

are added to a suspension of 100 ml of dimethyl sulphoxide, 2.1 g of sodium cyanide and 7.1 g of copper(I) cyanide at 70° to 75° C. with stirring, and the mixture is stirred at this temperature for 30 minutes. The temperature is then raised to 110° C. for 30 minutes, and the batch is subsequently slowly cooled by stirring, filtered off with suction, the product is washed with 45 ml of dimethyl sulphoxide, 7.5% strength aqueous ammonia solution and water and dried under reduced pressure. In this manner, 38.5 g of the dye of the formula

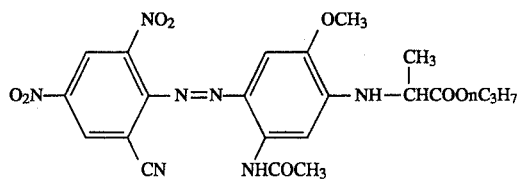

which has an absorption maximum at 615 nm and forms a blue solution in o-dichlorobenzene are obtained.

0.6 g of the dye thus obtained is stirred into 2000 g of water in finely dispersed form. The dispersion is brought to a pH of 4.5 with acetic acid and sodium acetate, and 2.0 g of a commercially available dispersant based on a naphthalenesulphonic acid/formaldehyde condensation product are added.

The dye liquor thus obtained is entered with 100 g of a polyester fabric based on polyethylene glycol terephthalate, and dyeing at 130° C. is carried out for 1 hour.

Subsequent rinsing, reductive aftertreatment with a 0.2% strength sodium dithionite solution at 70° to 80° C. for 15 minutes, rinsing and drying give a blue dyeing of high color strength and very good coloristic properties, in particular very good fastness to dry heat pleating and setting, thermomigration and wash-fastness.

EXAMPLE 2

If the 59.1 g of the bromine-containing dye in Example 1 are replaced by 55.3 g of the dye of the formula

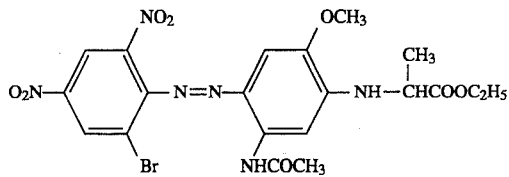

and the procedure as described in Example 1 is repeated, 37 g of the dye of the formula

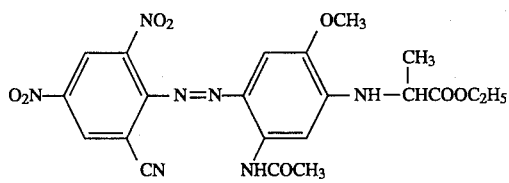

which also forms a blue solution in o-dichlorobenzene and has an absorption maximum at 616 nm are obtained.

20.0 g of the dye thus obtained are incorporated in finely divided form in a printing paste which contains 45.0 g of carob flour and 6,0 g of sodium 3-nitrobenzenesulphonate and 3.0 g of citric acid per 100 g. This printing paste is used to print polyester fabric, which is then dried, steamed for 15 minutes under a steam pressure of 1.5 atmospheres gauge, soaped off, rinsed again and dried, affording a strong blue print having very good coloristic properties.

EXAMPLE 3

53.9 g of the dye of the formula

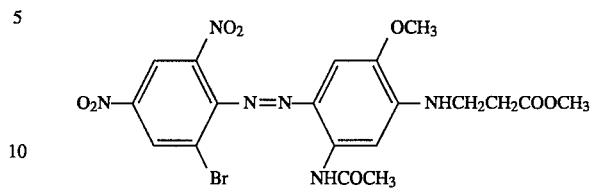

are converted in analogy to the details given in the example 1 to the dye of the formula

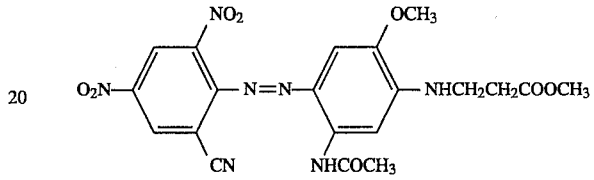

In this manner, 41.2 g of the dye which has an absorption maximum at 621 nm and forms a blue solution in o-dichlorobenzene are obtained.

As described in Example 1, 0.6 g of this dye in finely dispersed form is used to make up a dyeing liquor, in which 100 g of a polyester/cellulose mixed fabric (70:30) is dyed at 130° C. for 45 minutes. After subsequent rinsing, reductive aftertreatment with a 0.2% strength sodium dithionite solution at 70° to 80° C. for 15 minutes, rinsing and drying, the fabric is padded with a padding liquor which contains 40 g/l of a reactive resin, 20 g/l of a melamine resin, 20 g/l of a polyethylene emulsion and 20 g/l of a plasticiser and 8 g/l of a catalyst. The padded dyeing is then dried at 100° C. for 1 minute and condensed at 180° C. for 20 seconds. The dyeing thus finished is subjected to a wash-fastness test at 60° C. in the presence of an ECE detergent. The multi-fibre strip which had been added to the fabric test shows virtually complete resistance to soiling.

In Table 1 below, further dyes according to the invention are listed which also produce blue dyeings or prints of high colour strength and also very good coloristic properties on polyester material.

TABLE 1

$$O_2N-\underset{\underset{CN}{|}}{\underset{|}{C_6H_3}}(NO_2)-N=N-\underset{\underset{NHCOR}{|}}{\underset{|}{C_6H_3}}(OR^1)-NH-\overset{R^2}{\underset{|}{CH}}(CH_2)_n COOR^3 \quad (I)$$

| Ex. | R | R¹ | R² | R³ | n |
|-----|-----|-----|-----|-----|---|
| 4 | CH₃ | CH₃ | CH₃ | CH₃ | 0 |
| 5 | CH₃ | CH₃ | CH₃ | iC₃H₇ | 0 |
| 6 | CH₃ | C₂H₅ | CH₃ | CH₃ | 0 |
| 7 | CH₃ | C₂H₅ | CH₃ | C₂H₅ | 0 |
| 8 | CH₃ | C₂H₅ | CH₃ | nC₃H₇ | 0 |
| 9 | C₂H₅ | CH₃ | CH₃ | CH₃ | 0 |
| 10 | C₂H₅ | CH₃ | CH₃ | C₂H₅ | 0 |
| 11 | C₂H₅ | CH₃ | CH₃ | iC₃H₇ | 0 |
| 12 | CH₃ | (CH₂)₂OCH₃ | CH₃ | CH₃ | 0 |
| 13 | CH₃ | (CH₂)₂OCH₃ | CH₃ | C₂H₅ | 0 |
| 14 | CH₃ | (CH₂)₂OCH₃ | CH₃ | nC₃H₇ | 0 |
| 15 | CH₃ | (CH₂)₂OCH₃ | CH₃ | iC₃H₇ | 0 |
| 16 | CH₃ | (CH₂)₂OC₂H₅ | CH₃ | C₂H₅ | 0 |

TABLE 1-continued

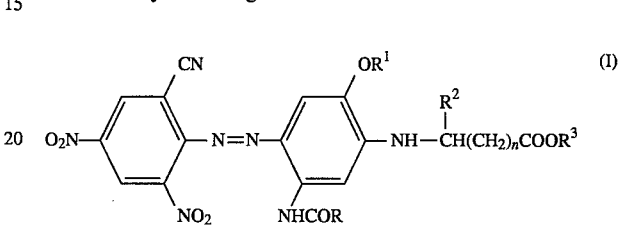

| Ex. | R | R$^1$ | R$^2$ | R$^3$ | n |
|---|---|---|---|---|---|
| 17 | CH$_3$ | (CH$_2$)$_2$OC$_2$H$_5$ | CH$_3$ | CH$_3$ | 0 |
| 18 | CH$_3$ | (CH$_2$)$_2$OC$_2$H$_5$ | CH$_3$ | nC$_3$H$_7$ | 0 |
| 19 | C$_2$H$_5$ | (CH$_2$)$_2$OCH$_3$ | CH$_3$ | CH$_3$ | 0 |
| 20 | C$_2$H$_5$ | (CH$_2$)$_2$OCH$_3$ | CH$_3$ | C$_2$H$_5$ | 0 |
| 21 | C$_2$H$_5$ | (CH$_2$)$_2$OCH$_3$ | CH$_3$ | nC$_3$H$_7$ | 0 |
| 22 | C$_2$H$_5$ | (CH$_2$)$_2$OCH$_3$ | CH$_3$ | iC$_3$H$_7$ | 0 |
| 23 | C$_2$H$_5$ | (CH$_2$)$_2$OC$_2$H$_5$ | CH$_3$ | CH$_3$ | 0 |
| 24 | C$_2$H$_5$ | (CH$_2$)$_2$OC$_2$H$_5$ | CH$_3$ | C$_2$H$_5$ | 0 |
| 25 | C$_2$H$_5$ | C$_2$H$_5$ | CH$_3$ | CH$_3$ | 0 |
| 26 | C$_2$H$_5$ | C$_2$H$_5$ | CH$_3$ | C$_2$H$_5$ | 0 |
| 27 | CH$_3$ | CH$_3$ | H | C$_2$H$_5$ | 1 |
| 28 | CH$_3$ | CH$_3$ | H | nC$_3$H$_7$ | 1 |
| 29 | CH$_3$ | C$_2$H$_5$ | H | CH$_3$ | 1 |
| 30 | CH$_3$ | C$_2$H$_5$ | H | C$_2$H$_5$ | 1 |
| 31 | C$_2$H$_5$ | CH$_3$ | H | CH$_3$ | 1 |
| 32 | C$_2$H$_5$ | CH$_3$ | H | C$_2$H$_5$ | 1 |
| 33 | CH$_3$ | (CH$_2$)$_2$OCH$_3$ | H | CH$_3$ | 1 |
| 34 | CH$_3$ | (CH$_2$)$_2$OCH$_3$ | H | C$_2$H$_5$ | 1 |
| 35 | CH$_3$ | (CH$_2$)$_2$OCH$_3$ | H | iC$_3$H$_7$ | 1 |
| 36 | CH$_3$ | (CH$_2$)$_2$OC$_2$H$_5$ | H | C$_2$H$_5$ | 1 |
| 37 | CH$_3$ | (CH$_2$)$_2$OC$_2$H$_5$ | H | CH$_3$ | 1 |
| 38 | C$_2$H$_5$ | C$_2$H$_5$ | H | C$_2$H$_5$ | 1 |
| 39 | C$_2$H$_5$ | (CH$_2$)$_2$OCH$_3$ | H | CH$_3$ | 1 |
| 40 | C$_2$H$_5$ | (CH$_2$)$_2$OCH$_3$ | H | C$_2$H$_5$ | 1 |
| 41 | C$_2$H$_5$ | (CH$_2$)$_2$OCH$_3$ | H | iC$_3$H$_7$ | 1 |
| 42 | C$_2$H$_5$ | (CH$_2$)$_2$OC$_2$H$_5$ | H | CH$_3$ | 1 |
| 43 | CH$_3$ | CH$_3$ | H | CH$_3$ | 0 |
| 44 | CH$_3$ | CH$_3$ | H | C$_2$H$_5$ | 0 |
| 45 | CH$_3$ | CH$_3$ | H | nC$_3$H$_7$ | 0 |
| 46 | CH$_3$ | C$_2$H$_5$ | H | CH$_3$ | 0 |
| 47 | CH$_3$ | C$_2$H$_5$ | H | C$_2$H$_5$ | 0 |
| 48 | CH$_3$ | C$_2$H$_5$ | H | iC$_3$H$_7$ | 0 |
| 49 | CH$_3$ | (CH$_2$)$_2$OCH$_3$ | H | CH$_3$ | 0 |
| 50 | CH$_3$ | (CH$_2$)$_2$OCH$_3$ | H | C$_2$H$_5$ | 0 |
| 51 | CH$_3$ | (CH$_2$)$_2$OC$_2$H$_5$ | H | C$_2$H$_5$ | 0 |
| 52 | C$_2$H$_5$ | CH$_3$ | H | CH$_3$ | 0 |
| 53 | C$_2$H$_5$ | CH$_3$ | H | nC$_3$H$_7$ | 0 |
| 54 | C$_2$H$_5$ | CH$_3$ | H | iC$_3$H$_7$ | 0 |
| 55 | C$_2$H$_5$ | C$_2$H$_5$ | H | CH$_3$ | 0 |
| 56 | C$_2$H$_5$ | (CH$_2$)$_2$OCH$_3$ | H | CH$_3$ | 0 |
| 57 | C$_2$H$_5$ | (CH$_2$)$_2$OCH$_3$ | H | C$_2$H$_5$ | 0 |
| 58 | C$_2$H$_5$ | (CH$_2$)$_2$OCH$_3$ | H | iC$_3$H$_7$ | 0 |
| 59 | C$_2$H$_5$ | (CH$_2$)$_2$OC$_2$H$_5$ | H | CH$_3$ | 0 |
| 60 | C$_2$H$_5$ | (CH$_2$)$_2$OC$_2$H$_5$ | H | C$_2$H$_5$ | 0 |
| 61 | CH$_3$ | CH$_3$ | C$_2$H$_5$ | CH$_3$ | 0 |
| 62 | CH$_3$ | C$_2$H$_5$ | C$_2$H$_5$ | C$_2$H$_5$ | 0 |
| 63 | CH$_3$ | CH$_3$ | C$_2$H$_5$ | nC$_3$H$_7$ | 0 |
| 64 | C$_2$H$_5$ | CH$_3$ | C$_2$H$_5$ | C$_2$H$_5$ | 0 |
| 65 | CH$_3$ | C$_2$H$_5$ | C$_2$H$_5$ | C$_2$H$_5$ | 0 |
| 66 | CH$_3$ | (CH$_2$)$_2$OCH$_3$ | C$_2$H$_5$ | C$_2$H$_5$ | 0 |
| 67 | C$_2$H$_5$ | (CH$_2$)$_2$OCH$_3$ | C$_2$H$_5$ | CH$_3$ | 0 |

TABLE 2

| Ex. | R | R$^1$ | R$^2$ | R$^3$ | n | Proportion in the mixture |
|---|---|---|---|---|---|---|
| 68 | CH$_3$ | CH$_3$ | H | CH$_3$ | 1 | 50% |
|  | C$_2$H$_5$ | CH$_3$ | H | CH$_3$ | 1 | 50% |
| 69 | CH$_3$ | CH$_3$ | H | CH$_3$ | 1 | 70% |
|  | CH$_3$ | CH$_3$ | H | C$_2$H$_5$ | 1 | 30% |
| 70 | CH$_3$ | CH$_3$ | H | C$_2$H$_5$ | 1 | 60% |
|  | CH$_3$ | C$_2$H$_5$ | H | CH$_3$ | 1 | 40% |
| 71 | CH$_3$ | CH$_3$ | H | C$_2$H$_5$ | 1 | 55% |
|  | CH$_3$ | CH$_3$ | CH$_3$ | C$_2$H$_5$ | 0 | 45% |
| 72 | CH$_3$ | (CH$_2$)$_2$OCH$_3$ | H | CH$_3$ | 1 | 10% |
|  | CH$_3$ | CH$_3$ | CH$_3$ | nC$_3$H$_7$ | 1 | 90% |
| 73 | C$_2$H$_5$ | CH$_3$ | CH$_3$ | nC$_3$H$_7$ | 0 | 80% |
| 74 | CH$_3$ | CH$_3$ | CH$_3$ | iC$_3$H$_7$ | 0 | 20% |
|  | C$_2$H$_5$ | CH$_3$ | CH$_3$ | iC$_3$H$_7$ | 0 | 40% |
|  | CH$_3$ | CH$_3$ | CH$_3$ | C$_2$H$_5$ | 0 | 60% |
| 75 | CH$_3$ | CH$_3$ | H | C$_2$H$_5$ | 1 | 25% |
|  | CH$_3$ | C$_2$H$_5$ | H | CH$_3$ | 1 | 25% |
|  | CH$_3$ | CH$_3$ | CH$_3$ | CH$_3$ | 0 | 50% |
| 76 | CH$_3$ | CH$_3$ | CH$_3$ | iC$_3$H$_7$ | 0 | 95% |
|  | CH$_3$ | C$_2$H$_5$ | CH$_3$ | C$_2$H$_5$ | 0 | 5% |

We claim:

1. Azo dye of the general formula I

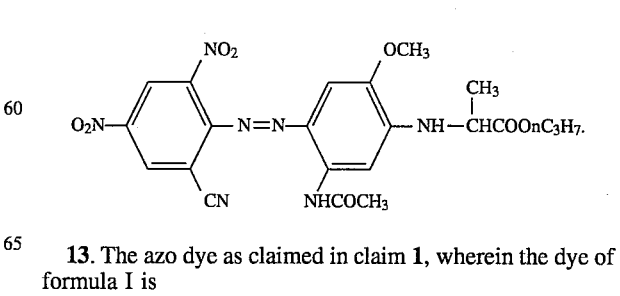

in which

R is methyl or ethyl,

R$^1$ is methyl, ethyl, methoxyethyl or ethoxyethyl,

R$^2$ is methyl or ethyl, if n is equal to 0, and hydrogen, if n is equal to 1,

R$^3$ is methyl, ethyl, n-propyl or i-propyl and n is 0 to 1.

2. Azo dye according to claim 1, characterized in that R is methyl.

3. Azo dye according to claim 1, characterized in that R$^1$ is methyl or methoxyethyl.

4. Azo dye according to claim 1, characterized in that R$^2$ is methyl, if n is equal to 0.

5. Azo dye according to claim 1, characterized in that R$^3$ represents methyl, if n is equal to 1, and methyl, ethyl, n-propyl or i-propyl, if n is equal to 0.

6. Dye mixture, characterized in that it contains more than one azo dye of the general formula I of claim 1.

7. Dye mixture according to claim 6, characterized in that the weight of one dye component is 10 to 90% based on the total weight of the dye components.

8. Dye mixture according to claim 7 wherein the weight of one dye component is 30 to 70% based on the total weight of the dye components.

9. The azo dye according to claim 2, wherein R$^1$ is methyl or methoxy.

10. The azo dye according to claim 9, wherein R$^2$ is methyl, if n is equal to zero.

11. The azo dye according to claim 10, wherein R$^3$ is methyl, if n equals 1 and methyl, ethyl, n-propyl or i-propyl if n equals zero.

12. The azo dye as claimed in claim 1, wherein the dye of formula I is

13. The azo dye as claimed in claim 1, wherein the dye of formula I is

14. The azo dye as claimed in claim 1, wherein the dye of formula I is
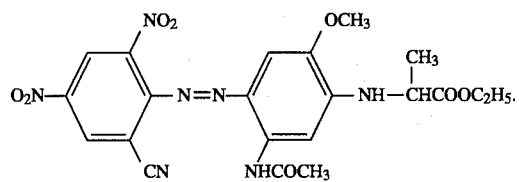
15. The azo dye according to claim 11, wherein n equals zero.
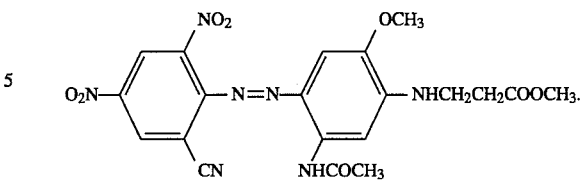
* * * * *